Figure 1:
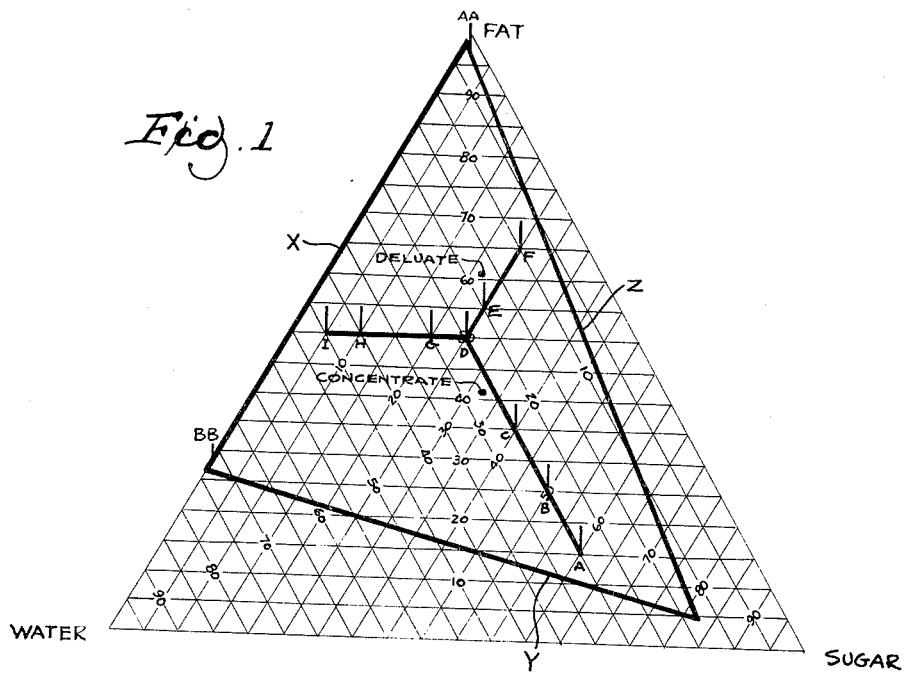

INVENTORS
GERALD L. NEUSER
HAMILTON A. PINKALLA
L. RUSSELL COOK
ROY E. KORFHAGE

ATTORNEY

United States Patent Office 3,223,532
Patented Dec. 14, 1965

3,223,532
EMULSIONS FOR FOOD USE
Hamilton A. Pinkalla, Gerald L. Neuser, Leon R. Cook, and Roy F. Korfhage, Milwaukee, Wis., assignors, by mesne assignments, to W. R. Grace & Co., New York, N.Y., a corporation of Connecticut
Filed Aug. 6, 1963, Ser. No. 301,699
7 Claims. (Cl. 99—123)

Continuation-in-part of S.N. 192,563, filed May 4, 1962, now abandoned.

This invention relates to edible water-in-oil emulsions with any optional flavors, colors, preservatives and the like, for use as foods or in connection with other foods such as coating or enrobing compositions for other foods.

Only substantially anhydrous fat compositions have heretofore been used for coating or enrobing other foods such as candy, cookies and the like, and such compositions have the following properties:

(1) Proper viscosity (for desired flow and uniformity of coverage upon dipping, and desired thickness of coating).
(2) Setting time as required by manufacturing conditions.
(3) Desired firmness of coating at normal consumption temperatures.
(4) No "specking" (non-uniform color).
(5) Complete continuity of oil phase, and
(6) Releasability from a mold or belt.

However, such substantially anhydrous fat based compositions present certain economic and physical problems in their manufacture and use, namely:

(1) Manufacture of fat based compositions requires use of heavy and expensive mixing and refining equipment and "work out" kettles, which are expensive to maintain and which can be eliminated if an emulsion can be used.
(2) Change in cost of product due to changes in fat and sugar prices on commodity markets which may wipe out the usual small profit margins, or may make the price of the composition highly unstable.
(3) Flavors in fat based compositions can be tasted only after the fat is melted to release from the fat the flavor particles so that they may act on the taste buds.
(4) When cocoa is used as a flavor, it is desirable to cook the cocoa to produce a more intense flavor per pound of material, but the water must be removed before mixing the cooked material with the fat based composition whereby all of the advantage of cooking is lost.
(5) Inadvertent addition of water spoils a fat based composition for use for coatings and the like, by greatly increasing its viscosity.
(6) Fat based compositions present substantial thicknesses of fat which tends to flake off when a fat based product is eaten at temperatures below the melting point of the fat. Fat based coatings on ice cream are especially brittle and flaky as they are usually eaten at temperatures of 5–10° F. which are well below the melting point of the usual fats used.
(7) Any fat-insoluble material put into a fat based composition can only be dispersed therein and tends to make the composition more viscous.

Our water-in-oil emulsion retains all of the desirable qualities of the fat based compositions now used for coatings and the like, and avoids or eliminates the above problems and the following undesirable characteristics of such compositions. Our emulsion:

(1) Eliminates expensive and heavy mixing, refining and conching equipment.
(2) Reduces the amount of fat and sugar required for a given use so that the profit in the final product is no longer so fully dependent on changes in prices of those commodities.
(3) When stored at temperatures above the melting point of the fat, does not separate into a hard lower layer of solids and a small amount of fat which is difficult to mix with an upper layer of fat.
(4) Eliminates the sensation of greasiness in the mouth and avoids an oily flavor usually resulting from the use of fat based compositions.
(5) Allows use of water soluble flavors and colors which now comprise the majority of those legally permitted.
(6) Secures more intense flavor and color from water soluble materials than when such materials must be dispersed in a fat based composition.
(7) Eliminates the problem of water absorption during enrobing of ice cream and other water containing food.

The fats we use are edible and preferably one or more vegetable oils which may be hydrogenated in whole or in part, or a fraction of a hydrogenated vegetable oil or mixtures of such oils may be used. The kinds of fat or oil used, determines the melting point of the emulsion and hence the uses to which each emulsion is suited. Thus, choice of the fats in part determines the coverage of other foods at a given temperature, the hardness of the covering at various consumption temperatures and the flavor of the coating (in combination with other flavoring materials).

Although sugar is omitted when our water-in-oil emulsion is used for foods for those whose intake of sugar must be restricted, sugar is used in the greater portion of our emulsions and we will describe our water-in-oil emulsions as containing sugar. Change in the ratio of sugar to water, of water to fat, or of fat to sugar, or in the type and proportions of emulsifiers used, produces changes in properties of our water-in-oil emulsion or may even cause the breaking of the emulsion and its separation into fat and water masses. In our emulsions there are two liquid phases available (that is fat and water phases) as compared to a suspension of solids in one liquid phase in the known fat based coatings, for carrying both the flavor and color or either of them. Water-in-oil emulsions may be prepared with:

(1) A fat soluble flavor and a fat soluble color;
(2) A water soluble flavor and a water soluble color;
(3) A fat soluble flavor and a water soluble color;
(4) A fat soluble color and a water soluble flavor; and
(5) Flavoring and coloring agents which are dispersible rather than soluble in a fat or water phase.

Water-in-oil emulsions thus secure the possibility of use of various colors and flavorings free from objections as to their solubility.

We have discovered that variations in the material of the composition are related in the making of various water-in-oil emulsions, to invariably produce water-in-oil emulsions which may have any optional amount of flavor and color and a minimum of fats, with the desired viscosity and with other physical properties for any specified use.

Figure 2:
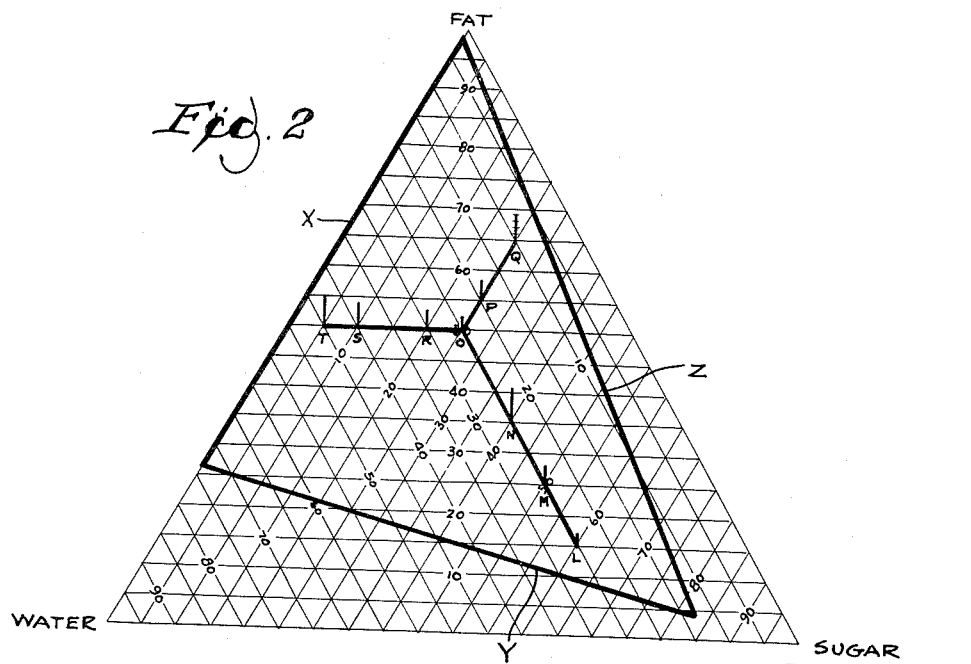

FIGURES 1 and 2 of the drawings are each three phase, three-dimensional graphs showing respectively how two and three variables in the composition are changed to obtain a desired viscosity in a water-in-oil emulsion. The graphs shown the percentages of the water, of the sugar, and of the fat to be used in a sweetened emulsion. Pegs designated A–T represent the emulsifier concentrations used in particular formulations, the height of each peg showing the total amount of the emulsifier combination used and each unit on a peg representing 2% of the total emulsifier.

FIG. 1 shows formulations all prepared at 9.5% (of the weight of the fat) total emulsifier levels while FIG. 2 shows similar formulations at varying total emulsifier levels. The table below gives the changes in composition and viscosity of the various emulsions at points A–I in FIG. 1, as measured on the well-known MacMichael viscosimeter (National Confectioners Association, standard method). This device measures torque on a wire with a bob immersed in a cup which is driven at a given speed and is filled with the composition of which the viscosity is to be measured, the sample being cooled to a specified temperature.

TABLE I

*9.5% total emulsifier*

[See FIG. 1]

| Graph point | A | B | C | D | E | F | G | H | I |
|---|---|---|---|---|---|---|---|---|---|
| Percent total fat | 15 | 25 | 35 | 50 | 55 | 65 | 50 | 50 | 50 |
| Percent total water | 25 | 25 | 25 | 25 | 20 | 10 | 30 | 40 | 45 |
| Percent total sugar | 60 | 50 | 40 | 25 | 25 | 25 | 20 | 10 | 5 |
| Viscosity | 300 | 295 | 115 | 45 | 35 | 18 | 65 | 90 | 100 |

NOTE.—All percentages are by weight.

It will be noted that even if the level of emulsifier is kept constant, widely different viscosities can be obtained. The high viscosity emulsions of points A and B are in themselves suitable as foods such as centers for confections. Emulsions of viscosity 35–150 degrees MacMichael are useful as icings, candy coatings, sauces and the like, while emulsions of viscosities of 18–35 are useful for enrobing ice cream bars and the like.

The pegs of FIG. 2 are severally indicated L through T and the table below gives the changes in composition and viscosity for the changes in emulsifier levels (4–12%) as indicated by the height of the pegs L–T.

TABLE II

[See FIG. 2]

| Graph point | L | M | N | O | P | Q | R | S | T |
|---|---|---|---|---|---|---|---|---|---|
| Percent total fat | 15 | 25 | 35 | 50 | 55 | 65 | 50 | 50 | 50 |
| Percent total water | 25 | 25 | 25 | 25 | 20 | 10 | 30 | 40 | 45 |
| Percent total sugar | 60 | 50 | 40 | 25 | 25 | 25 | 20 | 10 | 5 |
| Viscosity | (1) | 155 | 165 | 42 | 30 | 10 | 35 | 72 | 105 |

1 Inverts.

It will be noted that all the compositions of Table II are identical in total fat, water and sugar content to those of Table I. However, the amount of emulsifier varies 4–12% as shown in FIG. 2. Composition L compares with composition A (Table I) but now inverts to oil-in-water form. The viscosities in Table II are lower than those of corresponding compositions in Table I except for compositions N and T. It will be seen that substantially different viscosities are obtainable when different emulsifier amounts are used with the same composition of the above components.

In the compositions of A–T, the fat used was a hydrogenated palm kernel oil (Wiley M.P. 102° F.) and we use 7.1% (of the weight of fat) of an edible animal or vegetable (non-mineral) wax such as beeswax. The emulsifiers used for Formula A–T, were 1.31% (of the weight of fat) of acetylated tartrated glyceryl mono-stearate (Drewmulse A.T.M.S Spec.) and 8.15% (of the weight of fat) of glyceryl mono-oleate (Myverol 18–71E) which makes a ratio of hydrophilic to lipophilic emulsifiers of 13.85% to 86.15% respectively. The above combination of emulsifiers gives an HLB within the values (3–6) accepted as best for a water-in-oil emulsion (see Becher; Emulsions, Theory & Practice, ACS Monograph 135, © 1957).

We prefer water-in-oil emulsions with at least 1.8% added water so that peg AA of FIG. 1 is at 1.8 on the water phase scale and the line extending across the graph to peg BB at 74% on the water phase scale shows the maximum water concentrations we wish to use. Other percentages of water are represented by the various pegs of FIGS. 1 and 2 with the limits of compositions of suitable viscosity for our water-in-oil emulsions being indicated by that area enclosed by lines X, Y and Z.

It will be seen that the ranges of percentages of the two essential major components of the present emulsions, and of the non-essential sugar as shown on the graphs, are:

| | Percent |
|---|---|
| Fat | 4.7–98.2 |
| Water | 1.8–74.0 |
| Sugar | 0–83.0 | in which "sugar" includes all water soluble or dispersible materials, if used, and "fat" includes fat, wax, emulsifiers and oil soluble or dispersible materials if used. The emulsifier level may be as low as 1% (of the weight of the fat) in high fat compositions. "Invert" sugar, honey, corn syrup or the like may be used to reduce the degree of sugar crystallization upon cooling of high sugar compositions. Flavors and colors may be added in any amounts to yield the intensity of flavor and color desired. The flavor may be any natural or synthetic flavor acceptable for food use. The color is, of course, one of those certified for food use and may also be natural or synthetic and may be carried in edible liquids such as glycerine, propylene glycol and water. Both the flavor and color may be soluble or dispersible in oil or water as either the fat or water makes a suitable carrier therefor. As was said above no sugar whatever need be used and flavor and color may be omitted or used as desired. Other incidental materials such as salt, preservative, artificial sweeteners, etc. may also be added as required.

Natural, bleached or unbleached beeswax or any other edible vegetable or animal wax in the range of 1–10% (of the weight of the fat) allows us to produce a greater range of our water-in-oil emulsion than when wax is omitted. We have found that a balanced combination of hydrophilic emulsifier, such as lecithin (O/W type), and lipophilic emulsifier, such as glyceryl mono-oleate (Myverol 18–71E), is required to obtain the emulsion stability we desire and that the combined emulsifier gives best results when dissolved in the fat phase (agent in oil or "Ao" method). Other combinations of lipophilic emulsifiers, such as various glyceryl mono-oleates, certain glyceryl mono-stearates and propylene glycol esters and hydrophilic emulsifiers, such as acetylated tartrated esters of mono and diglycerides and polyoxyethylene (20) sorbitan mono-stearate and oleate, may be used. In substituting emulsifiers, the amount of each emulsifier actually used is corrected based on the purity of the particular compounds in the emulsifiers listed, all of which are available on the present market.

Our emulsifier combination is chosen to yield a hydrophilic-lipophilic balance (HLB) which has been found most effective (3–6) in promoting adsorption at the interface of the two immiscible liquids, namely water and fat, to yield a water-in-oil emulsion which will not invert or break when stored in liquid or solid condition or when remelted after storage as a solid. Such adsorption is a purely physical phenomenon as is shown from the fact that we can repeatedly solidify and remelt our emulsions without chemical change. However, we do observe such precautions as avoiding strong alkalis in the water and other materials which are known to inhibit or prevent formation of water-in-oil emulsions, or reduce stability thereof, because of chemical action with fat, emulsifiers or aqueous phases. We have tabulated below various emulsifiers and their most significant properties, which will serve respectively as hydrophilic and as lipophilic emulsifiers and as thinners to be used as replacements of part of the lipophilic emulsifiers.

TABLE III

Hydrophilic emulsifiers

| Chemical name | HLB | °F. or °C. M.P. | Iodine value | Average purity | Trade name |
|---|---|---|---|---|---|
| Lecithin (O/W type) | | Liquid at room temperature. | 90–95 | 60.0 | Centrophil S.M. S1009. |
| Polyethylene glycol 400 distearate | 7.8 | 2 C | 45–50 | 90.0 | S1802. |
| Polyethylene glycol 400 mono-oleate | 11.0 | 2 C | 31–40 | 100.0 | Drewmulse A.T.M.G. |
| Acetylated tartrated monoglyceride of veg. oil. | 12.0 | Liquid at room temperature. | 45–55 | 8.5 | TEM 4H. |
| Acetylated tartrated glyceride of veg. oil. | 12.0 | 130 F | 5 | 20.0 | Glycosperse S20. |
| Polyoxyethylene (20) sorbitan monostearate. | 14.9 | Liquid at room temperature. | 1.5 | 100.0 | Tween 60. |
| Do | 14.9 | do | 19–22 | 100.0 | Drewmulse ATMS Spec. |
| Acetylated tartrated glyceryl monostearate. | 15.0 | 131 F | 3 max. | 30.0 | Gloss-Add. |
| Do | 15.0 | 136 F | 3 max. | 40.0 | TEM 4C. |
| Do | 15.0 | Soft paste room temperature. | 60 | 20.0 | Glycosperse 020. |
| Polyoxyethylene (20) sorbitan mono-oleate. | 15.0 | Liquid at room temperature. | 19–22 | 100.0 | |

Tested with lipophilic emulsifier, Myverol 18–71E.

TABLE IV

Lipophilic emulsifiers

| Chemical name | HLB | °F. or °C. M.P. | Iodine value | Average purity | Trade name |
|---|---|---|---|---|---|
| Lecithin (W/O type) | | Liq. at room temp. | 90–95 | 4.0 | Centrophil IP. |
| Glyceryl mono-oleate | 3.4 | 65F | 70–80 | 42.5 | S1096. |
| Glyceryl mono-oleate from vegetable fat. | 3.5 | 118F | 65–75 | 42.5 | GMV soft. |
| Glyceryl mono-oleate from cottonseed oil. | 3.5 | 110F | 80–90 | 42.5 | Do. |
| Glyceryl mono-oleate from coconut oil. | 3.5 | 90F | 6–10 (ave. 8) | 52.5 | GM-CNO. |
| Glyceryl mono-oleate from peanut oil. | 3.5 | 49C | 80–90 | 42.5 | GM-PNO. |
| Glyceryl mono-oleate | 3.5 | 68F | 80–95 | 42.5 | GMO. |
| Do | 3.5 | 25C | 74–78 | 56.5 | Atmos 300. |
| Do | 3.5 | 95F | 65–70 | 90 min. | Myverol 18–71E. |
| Do | | | | 18% 74% | Myverol 18–98. |
| Glyceryl mono-linoleate | 3.8 | 102–108F | 110–120 | 74% | |
| Glyceryl monostearate | 3.8 | 115–122F | 54–64 | 50.0 | Atmul 80. |
| Do | 3.8 | 125–127F | 54–61 | 56.0 | Atmul 122. |
| Glyceryl mono-oleate | 5.2 | 10F | 65–75 | 38.0 | S1097. |
| Propylene glycol stearate | 5.4 | 43–46C | 7 | 100.0 | Pegosperse PS. |

Tested with hydrophilic emulsifier, Drewmulse ATMS Spec.

TABLE V

Lipophilic thinners

[Not usful as primary emulsifiers]

| Chemical name | HLB | °F. or °C. M.P. | Iodine value | Average purity | Trade name |
|---|---|---|---|---|---|
| Glyceryl mono-oleate | 3.5 | 135–142F | 2 | 54.0 | Atmos 150. |
| Glyceryl monostearate | 3.6 | 134.6–141.8F | 5 | 42.5 | Aldo 33. |
| Do | 3.8 | 138–142F | 8 max. | 42.0 | Atmul 84K. |
| Do | 3.8 | 140F | 3 max. | 42.5 | GMS-V-hard. |
| Do | 3.8 | 140F | 3 max. | 42.5 | GMS-V-hard-SE. |
| Glyceryl lactopalmitate | 4.0 | 140F | 2 max. | 12.0 | GLP-12. |
| Glyceryl lactostearate | 4.0 | 140F | 2 max. | 12.0 | GLS-12. |
| Do | 4.0 | 140F | 5 max. | 12.0 | SL 101. |
| Sorbitan monostearate | 4.7 | 122F | 2½ | 100.0 | Glycomul S. |
| Do | 4.7 | 122F | 5 | 100.0 | Span 60. |
| Glyceryl monostearate | 5.8 | 132.8–141.8F | 5 | 39.0 | Aldo 28. |

Tested with hydrophilic emulsifier, Drewmulse ATMS Spec. and lipophilic emulsifier, Myverol 18–71E.

It will be seen that, even though the above tables each include compounds having the same chemical name the compounds are not chemically the same due to the different sources from which they are derived and differences in processes of their manufacture. All hydrophilic emulsifiers in Table III have a hydrophilic-lipophilic balance (HLB) of 7.8 or more while the lipophilics in Table IV have a hydrophilic-lipophilic balance of 5.4 or less, and that the iodine values for compounds of the same name vary widely. Referring to Tables IV and V, monoglycerides of iodine value of 8 and above or mixtures of such compounds, may be employed as prime lipophilic emulsifiers in producing water-in-oil emulsions while all saturated mono-glycerides of iodine values below 8 are useful only as thinners and cannot be used as primary emulsifiers. We have found that we may replace up to 30% of the lipophilic W/O forming emulsifiers of Table IV by the lipophilic thinners of Table V (hereinafter called thinners to distinguish from the prime emulsifiers) to reduce viscosity and to avoid sticking of the emulsion in the user's mouth.

A specific example is given below of a composition at two different viscosities, illustrating various compositions for various uses.

*Lemon coating*

| | °F. M.P. | Higher viscosity concentrate, percent | Lower viscosity diluate, percent |
|---|---|---|---|
| Water | | 25.97 | 17.32 |
| Fat, coconut oil | 76 | 35.42 | 56.94 |
| Sugar: | | | |
| Granular | | 26.87 | 17.92 |
| Invert | | 5.62 | 3.74 |
| Emulsifier: | | | |
| hydrophilic: di-acetyl tartaric acid esters of mono and diglycerides | 135 | 0.21 | 0.14 |
| lipophilic: glyceryl monooleate | ¹ 95 | 0.97 | 0.65 |
| lipophilic: glyceryl monostearate | 134-142 | 0.42 | 0.28 |
| Flavor: | | | |
| Lemon oil (fat soluble) | | 1.09 | 0.72 |
| Citric acid | | 0.19 | 0.13 |
| Color: yellow food color (water soluble) | | 0.21 | 0.14 |
| Beeswax | 147-149 | 3.03 | 2.02 |

¹ To clarity.  ² Thinner.

The above concentrate was re-melted and solidified a number of times without change in viscosity or other physical properties. When diluted (8000 gms. of concentrate to 4000 gms. of oil), the viscosity was 27–30° MacMichael as desired in the present emulsion for enrobing ice cream. A number of ice cream bars were enrobed at 90° F. and were stored at −4° F. and examined at frequent intervals over ten weeks time. There was no oiling off, no deterioration of fat nor specking of the coating and the flavor appeared to be intensified. At the end of ten weeks, the flavor was good, the ice cream seemed "fresh" and there were no cracks, or other blemishes in the coating.

In processing, the first step is a blending of liquified fat or oil and wax and the emulsifiers. We may then add an oil-compatible flavor or color or other optional materials to the blended oil phase and continue agitation thereof until the flavor and color are dissolved or thoroughly dispersed therein. Next, we blend together the water, sugar and any desired water-compatible optional materials and heat the aqueous phase to the temperature at which the emulsion is being prepared. The aqueous phase is then added to the liquified fat-emulsifier combination at a rate to maintain homogeneity of the mixture while agitating. Thereafter we continue to beat the mixture for a sufficient length of time to secure a globule size range of the aqueous phase within the known values for our emulsions. We have found that we can use a batch or continuous type of beater so long as we maintain homogeneity in the water to oil addition stage and beat sufficiently to secure the known globule size range of the dispersed water phase. Such beating is not unusual as we are successfully making up to 10,000 lbs. of a chocolate-flavored water-in-oil emulsion in as little as 60 minutes in a continuous 6-stage turbine type mixer with a 6 in. diameter rotor and operating at a speed of only 1200 r.p.m. The above processing steps are those known to the art and do not present difficulty or novelty.

We have found that a finished emulsion can be lowered in viscosity by simply adding, with relatively gentle agitation, the emulsion to additional melted fat or oil, the water-in-oil emulsion being at or above the melting temperature of the fat or oil.

We claim:

1. An edible water-in-oil emulsion consisting essentially of 4.7–98.2% of edible fat, 1.8–74.0% of water, 1.0–12.0% of a mixture of edible non-ionic hydrophilic and lipophilic emulsifiers having a total HLB of 3–6, the emulsifiers being in the proportions of 0–75.0% of hydrophilic and 100–25.0% of lipophilic, the lipophilic emulsifier having an iodine value of 8 and above, and 1.0–10.0% of edible wax, the percentages being by weight and the amounts of emulsifier and wax being a part of the total weight of fat, the proportions of the emulsion being variable for providing varying viscosities suitable for use in foods.

2. An edible water-in-oil emulsion consisting essentially of 4.7–98.2% of edible fat, 1.8–74.0% of water, 1.0–12.0% of a combination of non-ionic hydrophilic and lipophilic emulsifiers in the proportions of 0–75.0% and 100–25.0% respectively, the hydrophilic emulsifier portion having an HLB of 7.8 and above and the lipophilic emulsifier portion having an HLB of 5.4 and below and having an iodine value of 8 and above, the emulsifiers being selected to provide a total HLB of 3–6, 1.0–10.0% of edible wax, the percentages being by weight and the amounts of emulsifier and wax being a part of the total weight of fat, each formula of emulsion within the given limits providing a given viscosity suitable for use in foods.

3. An edible water-in-oil emulsion consisting essentially of 4.7–98.2% of edible fat, 1.8–74.0% of water, 1.0–12.0% of an edible non-ionic combination of 0–75.0% of hydrophilic emulsifier having an HLB of 7.8 and above and 100–25.0% of primary lipophilic emulsifier, a lipophilic thinner for replacing up to 30% of the primary lipophilic emulsifier, the lipophilic emulsifier and thinner having an HLB of 5.8 and below, the primary lipophilic emulsifier having an iodine value of 8 and above and the lipophilic thinner having an iodine value below 8, and 1.0–10.0% of edible wax, the percentages being by weight and the amounts of emulsifier and wax being a part of the total weight of fat, the total HLB of the emulsifier being 3–6.

4. An edible water-in-oil emulsion consisting essentially of 4.7–98.2% of edible fat, 1.8–74.0% of water, 1.0–12.0% of a combination of 0–75.0% of edible non-ionic hydrophilic emulsifier having an HLB of 7.8 and above, 100–25.0% of fatty acid esters of monoglyceride for use both as a primary lipophilic emulsifier and a lipophilic thinner for replacing up to 30% of the lipophilic emulsifier and having an HLB of 5.8 and below, the lipophilic emulsifier and the thinner having iodine values respectively of 8 and above and below 8, and 1.0–10.0% edible wax, the percentages being by weight and the amounts of emulsifier and wax being a part of the total weight of fat and the total emulsifier and thinner HLB being 3–6.

5. An edible water-in-oil emulsion consisting essentially of 4.7–98.2% of edible fat, 1.8–74.0% of water, 1.0–12.0% of edible non-ionic hydrophilic and lipophilic emulsifiers having a total HLB of 3–6, the emulsifiers being in the proportion of 0–75.0% hydrophilic and 100–25.0% of lipophilic, the lipophilic emulsifier having an iodine value of 8 and above, 1.0–10.0% of edible wax, and 0–83.0% of sugar, the percentages being by weight and the amounts of emulsifiers and wax being a part of the total weight of fat, the sweetened emulsion providing a base of varying viscosity dependent on the formulation within the ranges given and suitable for use in foods.

6. An edible water-in-oil emulsion consisting essentially of 4.7–98.2% of edible fat, 1.8–74.0% of water, 1.0–12.0% of edible non-ionic hydrophilic and lipophilic emulsifiers having a total HLB of 3–6, the emulsifiers being in the proportion of 0–75.0% hydrophilic and of 100–25.0% lipophilic, the lipophilic emulsifier having an iodine value of 8 and above, 1.0–10.0% of edible animal wax, and 0–83.0% of sugar, the percentages being by weight and the amounts of emulsifiers and wax being a part of the total weight of fat, the emulsion providing varying viscosities suitable for use in foods.

7. An edible water-in-oil emulsion consisting essentially of 4.7–98.2% of edible fat, 1.8–74.0% of water, 1.0–12.0% of an edible non-ionic combination of 0–75.0% of hydrophilic emulsifier having an HLB of 7.8 and above and 100–25.0% of primary lipophilic emulsifier, a lipophilic thinner for replacing up to 30% of the primary lipophilic emulsifier, the lipophilic emulsifier and thinner having an HLB of 5.8 and below, the primary lipophilic emulsifier having an iodine value of 8 and above and lipophilic thinner having an iodine value below 8, 1.0–10.0% of edible wax, and 0–83.0% of sugar dissolved in the water, the percentages being by weight and the amounts of emulsifier and wax being a part of the total weight of fat and the total HLB of the emulsifier being 3–6.

References Cited by the Examiner

UNITED STATES PATENTS

| | | | |
|---|---|---|---|
| 2,191,352 | 2/1940 | Oprean | 99—134 |
| 2,671,027 | 3/1954 | Cross | 99—134 |
| 2,883,286 | 4/1959 | Musser | 99—139 |
| 3,117,010 | 1/1964 | Geisler | 99—118 |

OTHER REFERENCES

Becker, Emulsions Theory and Practice, Published by Reinhold Publication Co., N.Y., 1957, TP 156E6.

Griffin, The American Perfumer, May 1955, pp. 26 to 29.

A. LOUIS MONACELL, *Primary Examiner.*